United States Patent [19]

Asrar

[11] Patent Number: 5,399,428
[45] Date of Patent: Mar. 21, 1995

[54] FLAME RETARDANT POLYESTER COPOLYMERS

[75] Inventor: Jawed Asrar, Chesterfield, Mo.

[73] Assignee: Monsanto Company, St. Louis, Mo.

[21] Appl. No.: 209,340

[22] Filed: Mar. 11, 1994

[51] Int. Cl.$^6$ .................. D02G 3/00; C08G 63/692; C08G 79/02

[52] U.S. Cl. .................... 428/364; 528/272; 528/274; 528/287; 528/298; 528/302; 528/308; 525/437; 525/444

[58] Field of Search .............. 528/272, 274, 287, 298, 528/302, 308; 525/437, 444; 428/364

[56] References Cited

U.S. PATENT DOCUMENTS

| | | | |
|---|---|---|---|
| Re. 30,783 | 10/1981 | Kleiner et al. | 528/287 |
| 3,641,112 | 2/1972 | Ichikawa et al. | 560/93 |
| 3,874,157 | 4/1975 | Knopka | 57/255 |
| 3,922,323 | 11/1975 | Reese et al. | 558/77 |
| 3,941,752 | 3/1976 | Kleiner et al. | 528/287 |
| 3,969,437 | 7/1976 | Shim | 558/83 |
| 4,014,858 | 3/1977 | Chipman et al. | 528/283 |
| 4,022,826 | 5/1977 | Lohmar et al. | 562/817 |
| 4,034,141 | 7/1977 | Duffy et al. | 428/473 |
| 4,057,546 | 11/1977 | Knopka | 524/34 |
| 4,081,463 | 3/1978 | Birum et al. | 562/24 |
| 4,096,202 | 6/1978 | Farnham et al. | 525/64 |
| 4,101,528 | 7/1978 | Knopka | 524/409 |
| 4,204,070 | 5/1980 | Suzuki et al. | 560/94 |
| 4,365,054 | 12/1982 | Stabley, Jr. | 528/277 |
| 4,440,924 | 4/1984 | Kuze et al. | 528/275 |
| 4,501,878 | 2/1985 | Adams | 528/286 |
| 4,656,241 | 4/1987 | Iida et al. | 528/279 |
| 4,745,211 | 5/1988 | Jackson et al. | 560/80 |
| 4,959,450 | 9/1990 | Morris et al. | 528/272 |
| 4,970,286 | 11/1990 | Genz et al. | 528/193 |
| 4,983,707 | 1/1991 | Tanisake et al. | 528/193 |
| 4,983,777 | 1/1991 | Van Sickle | 568/568 |
| 4,985,501 | 1/1991 | Udipi | 525/173 |
| 5,011,877 | 4/1991 | Morris et al. | 524/115 |
| 5,011,878 | 4/1991 | Morris et al. | 524/115 |
| 5,116,938 | 5/1992 | Engel-Bader et al. | 528/272 |

FOREIGN PATENT DOCUMENTS

0510591A2  10/1992  European Pat. Off. .
55-718      1/1980   Japan .
9302122     2/1993   WIPO .

Primary Examiner—Samuel A. Acquah
Attorney, Agent, or Firm—Lawrence L. Limpus

[57] ABSTRACT

A flame retardant linear polyester comprising the product of a polyethylene terephthalate prepolymer, bis-hydroxy alkyl bibenzoate and a flame-retarding amount of a carboxy-phosphinic acid, a process for producing the polyester and products produced from the polyester are disclosed.

45 Claims, No Drawings

FLAME RETARDANT POLYESTER COPOLYMERS

BACKGROUND OF THE INVENTION

This invention relates to new flame retardant polyester compositions. More particularly, this invention relates to new flame retardant copolyesters and to a method for producing the copolyester compositions. More particularly this invention relates to new flame retardant copolyesters produced from terephthalic acid, another dicarboxylate moiety and carboxy-phosphinic acids, a process for producing the copolyesters and shaped articles produced from the copolyesters.

DESCRIPTION OF THE PRIOR ART

One of the major uses of polyesters is the production of shaped polyester articles and of woven and non-woven textiles such as fabrics, filaments, staples or yarn and of sheets. In recent years efforts to make textiles less flammable, to improve the safety characteristics of products such as apparel, bedding, home furnishings, aircraft and automobile interior fabrics and industrial fabrics, have increased. It is also recognized that the textiles may be blends, particularly blends of natural fibers, such as cotton, and synthetic fibers, such as polyesters.

There are various methods known for flame retarding textiles. U.S. Pat. No. 4,034,141 teaches the use of brominated phosphoramidates to treat combustible materials such as cotton and synthetic fibers to impart fire retardant properties. The fire retardant composition is applied by treating the fabric with a solution of the composition, drying the fabric and curing the composition.

U.S. Pat. No. 3,969,437 teaches the use of a specific class of cyclic phosphorus esters to prepare a durable, flame retardant textile finish for cotton-polyester blends. The phosphorus ester used must contain at least one carbon-bonded primary alcohol group, and preferably two or more, plus a pentavalent phosphorus ester group.

Surface treatment to impart flame retardant characteristics, and even the admixture of flame retardant compounds into hardenable shaped compositions, has disadvantages. Surface treatments may be removed by cleaning and admixed compounds may exude or migrate from the product. Therefore, attempts have been made to overcome these disadvantages by chemically building flame retardant compounds into the polyester.

U.S. Pat. No. 3,922,323 teaches a process for improving the flame resistance of polyesters, especially unsaturated polyesters, by chemically binding and/or admixing organic phosphorus compounds and, if desired, halogen compounds into the polyesters. Halogen containing, at least bicyclic phosphonic esters which are free from hydroxy and carboxylic groups are used.

U.S. Pat. No. 3,941,752 teaches a flame retarded, synthetic linear polyester modified with carboxy-phosphinic acids. The linear polyester is the polycondensation product of a dicarboxylic acid, a diol and a flame-retarding carboxy-phosphinic acid monomer which may contain hetero atoms. However, the polyester has a low glass transition temperature.

A need remains for flame retardant polyester materials which have a high glass transition temperature and which will maintain their flame retardant properties throughout their useful life and for a process to produce such a polyester.

SUMMARY OF THE INVENTION

It is an object of this invention to provide a flame retardant polyester material, a process to produce the polyester material and shaped articles produced from the polyester.

It is another object of this invention to provide a flame retardant copolyester composition in which the flame retardant material is chemically bound within the polymer structure.

These and other objects are met by this invention which is directed to copolyesters of terephthalic acid, a bis-hydroxy alkyl dicarboxylate and a carboxy-phosphinic acid monomer which have a flame retardant property and which have an intrinsic viscosity greater than about 0.6, and preferably within a range of from about 0.6 to about 1.2, and a glass transition temperature greater than about 65° C. The bis-hydroxy alkyl dicarboxylate is preferably bis-β-hydroxy ethyl bibenzoate or bis-β-hydroxy ethyl naphthanate and the carboxy-phosphinic acid monomer is preferably 2-carboxyethyl(phenyl)phosphinic acid, or the cyclic anhydride thereof. The dicarboxylate is copolymerized with the carboxy-phosphinic acid, terephthalic acid and ethylene glycol. The copolyester is preferably a polyethylene dicarboxylate copolyester having from 0% to about 99.9%, and preferably from about 10% to about 90%, by weight of polyethylene terephthalate; from 0% to about 99.9%, and preferably from about 10% to about 90%, by weight of bis-hydroxy alkyl dicarboxylate; and from about 0.1% to about 10% by weight of the carboxy-phosphinic acid monomer. The copolyester is produced by placing the desired amounts of terephthalic acid, hydroxy alkyl dicarboxylate, a diol such as ethylene glycol and carboxy-phosphinic acid in a nitrogen filled reactor in the presence of a catalyst which is preferably based upon antimony such as, for example, antimony oxide. The reactor is heated to a temperature within the range of from about 250° C. to about 293° C., and preferably within a range of from about 263° C. to about 293° C. for a period of about 3 hours. A vacuum is applied slowly to reduce the pressure to a pressure within the range of from about 0.5 to about 1.0 mm of mercury.

In addition to copolyesters of polyethylene terephthalate, the invention also includes copolyesters of other polyalkylene dicarboxylates such as polybutylene terephthalate and polyethylene naphthanate.

DESCRIPTION OF THE PREFERRED EMBODIMENTS

The present invention relates to copolyesters having flame retardant properties. The copolyesters of this invention have an intrinsic viscosity greater than about 0.6, and preferably within the range of from about 0.6 to about 1.2. The copolyesters are preferably a polyethylene dicarboxylate copolyester having from 0% to about 99.9%, and preferably from about 10% to about 90%, by weight polyethylene terephthalate; from 0% to about 99.9%. and preferably from about 10% to about 90%, by weight of another dicarboxylate moiety, which is preferably a bis-hydroxy alkyl bibenzoate and more preferably bis-β-hydroxy ethyl bibenzoate; and from about 0.1% to about 10% by weight of a flame retarding carboxy-phosphinic acid monomer having the general formula:

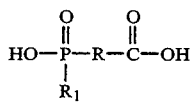

wherein R is a saturated open-chain or cyclic alkylene radical having from one to about 15 carbon atoms, preferably from 2 to about 10 carbon atoms, or an arylene or aralkylene radical having from 1 to about 15 carbon atoms such as, for example, methyl, ethyl, propyl, isopropyl, pentyl, neopentyl, hexyl, cyclohexyl, octyl, 2-ethylhexyl, iso-octyl, decyl, isodecyl, dodecyl, tetradecyl, —$C_6H_4$—, —$C_6H_4$—$CH_2$—, and —$C_6H_4$—$CH_2$—$CH_2$—, and $R^1$ is an alkyl radical having up to about 6 carbon atoms, an aryl radical or an alkaryl radical wherein the alkyl substituent has from 1 to about 6 carbon atoms such as, for example, methyl, ethyl and n- and i-propyl. The carboxy-phosphinic acid is preferably 2-carboxyethyl(phenyl) phosphinic acid, 2-carboxyethyl(methyl) phosphinic acid, the cyclic anhydride of 2-carboxyethyl(phenyl) phosphinic acid or the cyclic anhydride of 2-carboxyethyl(methyl) phosphinic acid.

In the production of polyethylene terephthalate, a polyethylene terephthalate prepolymer is produced as the reaction product of 1.1 to 1.2 moles of ethylene glycol and 1.0 moles of terephthalic acid. The polyethylene terephthalate prepolymer generally has a viscosity of 0.2 or less. Similar poly-alkylene-terephthalate prepolymers may be produced as the reaction product of 1.1 to 1.2 moles of an alkyl diol having from 3 to 8 carbon atoms and 1.0 moles of terephthalic acid. Similar prepolymers may also be produced as naphthanates by replacing the terephthalic acid in the reaction with naphthalene dicarboxylic acid. The polyalkylene terephthalate prepolymers and the polyalkylene naphthanate prepolymers may be considered as polyester prepolymers.

Polymerization of 90% by weight polyethylene terephthalate prepolymer and 10% by weight 2-carboxyethyl(phenyl)phosphinic acid produced a flame retardant polyester having an intrinsic viscosity of about 0.70. The resulting polyester, however, had a slight drop in the glass transition temperature, the melting point and the crystallinity when compared to polyethylene terephthalate, but the color of the polyester was better than the color of polyethylene terephthalate without the carboxy-phosphinic acid. The glass transition temperature, melting point and crystallinity of the polyester can be adjusted to desired levels by the addition of another dicarboxylate moiety in accordance with this invention.

The dicarboxylate moiety can be produced from any dicarboxylic acid except unsubstituted terephthalic acid. Thus the dicarboxylate moiety can be produced from an aliphatic group having from 2 to about 12 carbon atoms, from substituted or unsubstituted isophthalic acid, from the substituted or unsubstituted dicarboxylic acids of biphenyls, naphthalene, terphenyls and other polyaromatics such as, for example, diphenyl ether, and from substituted terephthalic acid. When a dicarboxylic acid other than unsubstituted terephthalic acid is reacted with terephthalic acid and a diol such as ethylene glycol, the copolyesters of this invention are produced. If, for example, a polyester having a high glass transition temperature or other good high temperature properties is desired, then the dicarboxylate moiety is preferably produced from an aromatic bis-hydroxy alkyl dicarboxylate. The dicarboxylate moiety is preferably produced from a hydroxy ethyl dicarboxylate compound or other hydroxy alkyl dicarboxylate compound having the general formula:

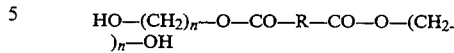

where each n is independently a number between 1 and 8, R is selected from the group consisting of aliphatic groups having from 2 to about 12 carbon atoms; substituted benzene wherein the substituent is a halogen, an alkyl group having a carbon chain of from 1 to about 8 carbon atoms, phenyl or a substituted phenyl group; naphthyl; substituted naphthyl wherein the substituent is hydrogen, halogen, an alkyl group having a carbon chain of from 1 to about 8 carbon atoms, phenyl or a substituted phenyl group; and a moiety having the general formula:

wherein $R^1$ is selected from the group consisting of nil, oxygen, phenyl, substituted phenyl, an alkyl group having a carbon chain of from 1 to about 8 carbon atoms and —HC≡CH— and wherein each $R^2$ is independently selected from the group consisting of hydrogen, halogen, an alkyl group having a carbon chain having from 1 to about 8 carbon atoms, phenyl and substituted phenyl. More specifically the dicarboxylate moiety is preferably produced from bis-β-hydroxy ethyl bibenzoate.

While the dicarboxylate moiety is preferably a hydroxy ethyl dicarboxylate compound, it is recognized that other hydroxy alkyl groups may be used and it is preferred that each of the alkyl groups be independently selected from the group consisting of alkyl radicals having from 1 to 8 carbon atoms such as, for example, methyl, propyl, isopropyl, butyl, hexyl, 2-ethylbutyl, octyl and 2-ethylhexyl groups.

The preferred dicarboxylate monomer is bis-β-hydroxy ethyl bibenzoate; however, the biphenyl moiety is not required. As shown above, the copolyesters of this invention may be produced equally well from a naphthanate or another dicarboxylate such as, for example, bis-hydroxy ethyl naphthanate, bis-hydroxy ethyl isophthalate, and bis-hydroxy ethyl diphenyl ether. Although these examples are of dicarboxylates having bis-hydroxy ethyl groups, other hydroxy alkyls such as, for example, bis-hydroxy butyl, bis-hydroxy hexyl and bis-hydroxy octyl groups can be used.

The dicarboxylate moieties used in the process have structures which will strengthen the polymer and impart rigidity to the polymer backbone. As a result the copolyester will have a higher glass transition temperature and the tensile and flexural properties of the polyester will be improved. When polyethylene naphthanate or other dicarboxylates are used to produce copolyesters in accordance with this invention, the resulting copolyesters have improved performance characteristics or properties such as, for example, higher glass transition temperature.

The flame retarding carboxy-phosphinic acid monomer has the general formula:

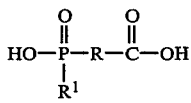

wherein R is a saturated open-chain or cyclic alkylene radical having from one to about 15 carbon atoms, preferably from 2 to about 10 carbon atoms, or an arylene or aralkylene radical having from 1 to about 15 carbon atoms such as, for example, methyl, ethyl, propyl, isopropyl, pentyl, neopentyl, hexyl, cyclohexyl, octyl, 2-ethylhexyl, iso-octyl, decyl, isodecyl, dodecyl, tetradecyl, —$C_6H_4$—, —$C_6H_4$—$CH_2$—, and —$C_6H_4$—$CH_2$—$CH_2$—, and $R^1$ is an alkyl radical having up to about 6 carbon atoms, an aryl radical or an alkaryl radical wherein the alkyl substituent has from 1 to about 6 carbon atoms such as, for example, methyl, ethyl and n- and i-propyl. The carboxy-phosphinic acid is preferably 2-carboxyethyl(phenyl) phosphinic acid, 2-carboxyethyl(methyl) phosphinic acid, the cyclic anhydride of 2-carboxyethyl(phenyl) phosphinic acid or the cyclic anhydride of 2-carboxyethyl(methyl) phosphinic acid.

The preferred acid, 2-carboxyethyl (phenyl)phosphinic acid, may be prepared in accordance with the teaching in U.S. Pat. No. 4,081,463. The 2-carboxyethyl(phenyl)phosphinic acid is prepared in two stages by first reacting dichloro(phenyl)phosphine with acrylic acid employed at a molar excess of 25% to 45% to form a mixture of three intermediates, 3-(chlorophenylphosphinyl) propionyl chloride, the cyclic anhydride of 2-carboxyethyl(phenyl)phosphinic acid and the mixed anhydride of acrylic acid with 3-chlorocarbonylethyl(phenyl)phosphinic acid. The second stage of the process is the hydrolysis of the of the mixture of the three intermediates to obtain the desired product, 2-carboxyethyl(phenyl)phosphinic acid.

The flame retardant copolyesters are preferably polyethylene dicarboxylate copolyesters having from about 99.9% to 0%, and preferably from about 90% to about 10%, by weight polyethylene terephthalate; from 0% to about 99.9%, and preferably from about 10% to about 90%, by weight of another dicarboxylate moiety; and from about 0.1% to about 10% of the flame retarding 2-carboxyethyl(phenyl) phosphinic acid, or the cyclic anhydride thereof. The properties desired in the copolyester products will determine the amount of the other dicarboxylate moiety included in the copolyester.

While the desired polyester of this invention may be produced by the polymerization of from about 99.9% to about 90% by weight polyethylene terephthalate prepolymer and from about 0.1% to about 10% by weight of 2-carboxyethyl(phenyl)phosphinic acid, the properties of the polyester can be improved by the addition of a hydroxy ethyl bibenzoate, preferably bis-$\beta$-hydroxy ethyl bibenzoate, to the polymerization to produce a copolyester. As the bis-$\beta$-hydroxy ethyl bibenzoate content increased, the flame retarding properties of the carboxy-phosphinic acid were surprisingly enhanced and the glass transition temperature of the copolyester increased. The expected decrease in reactivity during the polymerization reaction, resulting from the addition of the phosphinic acid rather than another carbonyl acid group, was not observed. The high molecular weight of the product polyester indicated that the phosphinic acid group was highly reactive and the end group analysis did not show terminal phosphinic acid groups in a high proportion. Further, the addition of phosphorus compounds usually creates additional observable color in the product. Surprisingly, the addition of the carboxy-phosphinic acid in this invention allowed the use of higher amounts of catalyst and still had less color in the product than polyesters produced without the included acid.

Copolyesters of polyethylene terephthalate and the carboxy-phosphinic acid having from about 0.1% to about 20% of another dicarboxylate moiety, such as a bibenzoate or naphthanate, produce a polyester that has a low melting point (Tm), low crystallinity and a low rate of crystallization. However these copolyesters have a higher glass transition temperature and better stability against ultraviolet light than polyethylene terephthalate. These polyesters would be particularly suited for use in the production of biaxially oriented films or other similar products.

Copolyesters of polyethylene terephthalate and carboxy-phosphinic acid having from about 20% to about 45% of another dicarboxylate moiety, such as a bibenzoate or naphthanate, produce an amorphous polyester that does not have a melting point. These polyesters would be particularly suited for use as a substitute for high temperature, amorphous polyethylene terephthalate.

Copolyesters of polyethylene terephthalate and carboxy-phosphinic acid having greater than about 45%, and preferably from about 45% to about 90%, of another dicarboxylate moiety, such as a bibenzoate, produce a polyester that has a high melting point (Tm) and higher crystallinity when compared to polyethylene terephthalate prepared at the same conditions. These polyesters would be particularly suited for use as high performance engineering plastics.

The addition of a few percent of another dicarboxylate moiety in the form of, for example, bis-$\beta$-hydroxy ethyl bibenzoate during the polymerization of polyethylene terephthalate raises the glass transition temperature of the resulting polyethylene terephthalate copolyester. It is possible to produce copolymers of polyethylene terephthalate and another dicarboxylate wherein the copolyesters have about 99.9% by weight polyethylene terephthalate and wherein the copolyesters have about 99.9% by weight of the other dicarboxylate moiety.

The properties of the copolyesters of polyethylene terephthalate are dependent upon the amount of the other dicarboxylate moiety included in the copolyester. Copolyesters having from about 99.9% to about 80% by weight polyethylene terephthalate and from about 0.1% to about 20% by weight of another dicarboxylate moiety have a low melting point, low crystallinity and a higher glass transition temperature. Copolyesters having from about 80% to about 55% by weight polyethylene terephthalate and from about 20% to about 45% by weight of another dicarboxylate moiety are amorphous. Copolyesters having from about 55% to about 10% by weight polyethylene terephthalate and from about 45% to about 90% by weight of another dicarboxylate moiety have a high melting point, high crystallinity and a higher glass transition temperature.

The copolyesters were produced by placing the desired amounts of polyethylene terephthalate prepolymer, bis-$\beta$-hydroxy ethyl bibenzoate and 2-carboxyethyl(phenyl)phosphinic acid in a nitrogen filled reactor in the presence of a catalyst which is preferably antimony oxide. The reactor was heated to a temperature within a range of from about 250° C. to about 293° C., and preferably within a range of from about 263° C. to about 293° C., for about 3 hours. A vacuum was applied slowly to reduce the pressure to a pressure of from about 0.5 to about 1.0 mm of mercury. The reaction was continued at those conditions for an additional 0.5 to 1.5 hours and the heat and vacuum were then removed.

The copolyesters and processes have been described above using polyethylene terephthalate prepolymer and the preferred hydroxy ethyl dicarboxylate moiety. However, the copolyesters can also be produced by using ethylene glycol and the appropriate diacid in the process with the polyethylene terephthalate prepolymer. Thus ethylene glycol and biphenyl dicarboxylic acid may be used in the process to replace bis-$\beta$-hydroxy ethyl bibenzoate, Similarly, ethylene glycol and naphthalene dicarboxylic acid may be used.

Ethylene glycol was used in the above description of the process and it is the preferred diol. However, other aliphatic diols such as, for example, aliphatic diols having from 3 to about 7 carbon atoms, may also be used.

The carboxy-phosphinic acid and its cyclic anhydride are not volatile under the process conditions for production of the polyesters so they can be incorporated in the polyester by inclusion in the condensation reaction. When incorporated into the molecule during the condensation reaction the phosphorus containing structural unit is randomly distributed in the linear polyester product.

The polyesters of this invention may be made into shaped articles. They may be spun into filaments and fibers using well known processes and the standard additional treatments. The polyesters may also be extruded into sheets or formed into shaped articles which may be solid or hollow by press molding, injection molding and extrusion. All of these shaped articles (fibers, sheets and other shapes) are also an object of this invention.

The fibers and filaments have very good and permanent flame retardant and self-extinguishing properties. Since they have a good degree of whiteness, they have very good dyeing properties for disperse dyestuffs and their receptivity includes acid dyestuffs in color shades of average to deep intensity. The tensile strength of the filaments and fibers, second order transition temperature and melting point approximately correspond to the values for polyesters which do not contain the flame retardant carboxy-phosphinic acid. The fibers and filaments are generally useful for applications where readily ignitible textiles cannot be tolerated and it is possible to use these fibers in combination with natural fibers, such as cotton, and other synthetic fibers.

Sheets and shaped articles produced from the flame retardant polyester are generally used in locations where it is desired to reduce the possible serious risks if ignition and a fire occur. If the transparency of the shaped articles is not of concern, their solidity and flame retarding properties can be enhanced by the inclusion of inorganic fiber materials such as, for example, glass and quartz fibers and carbon in the usual quantities, in the polyester before molding.

This invention will be explained in detail in accordance with the examples below, which are for illustrative purposes only and shall not limit the present invention. The ratio of the reactants and properties of the resulting copolymers are shown in the Table below.

EXAMPLE I

A round bottom flask was filled with 16 grams of the esterification product of ethylene glycol and terephthalic acid, where the molar ratio was 1.2 to 1 respectively, 2 grams of the esterification product of ethylene glycol and 4,4'-biphenyl dicarboxylic acid (bis-$\beta$-hydroxy ethyl bibenzoate) where the molar ratio was 2 to 1 respectively, 2 grams of 2-carboxyethyl(phenyl) phosphinic acid and 0.02 grams of antimony oxide, $Sb_2O_3$. The flask was fitted to a vacuum system, filled with nitrogen, and evacuated three times to remove all oxygen. The flask was then placed in a salt bath preheated to 250° C. The temperature was raised from 250° C. to 285° C. over a period of 1 hour and ethylene glycol was distilled off. After 90 minutes at 285° C., the pressure was reduced to 1.42 mmHg in 15 minutes. The pressure was further reduced over a period of 45 minutes to 0.20 mmHg. The reaction was continued at these conditions for an additional 30 minutes to complete the polymerization and the heat and vacuum were removed. The resulting polymer had an inherent viscosity of 0.90 at a concentration of 0.5 grams/deciliter in a solution of 60% phenol/40% tetrachloroethane at 25° C. The polymer had a diethylene glycol content of 1.45% by weight, and the glass transition temperature and the melting point determined by differential scanning calorimeter were 77° C. and 218.6° C. respectively. The results of Example I are shown in Table 1.

EXAMPLES II–VII

The process of Example I was repeated six times with the ratio of the esterification product of ethylene glycol and terephthalic acid to the esterification product of ethylene glycol and 4,4'-biphenyl dicarboxylic acid (bis-$\beta$-hydroxy ethyl bibenzoate) being varied while the amount of 2-carboxyethyl(phenyl) phosphinic acid and catalyst in the process was held constant. Polymerization was conducted in the same manner as described in Example I. The polymers produced in Examples II–VII, the inherent viscosity of the polymers at a concentration of 0.5 grams/deciliter in a solution of 60% phenol/40% tetrachloroethane at 25° C. and their diethylene glycol content, and the glass transition temperature and the melting point determined by differential scanning calorimeter are shown in Table 1.

EXAMPLE VIII

The process of Example I was repeated with 18 grams of the esterification product of ethylene glycol and terephthalic acid, where the molar ratio was 1.2 to 1 respectively, 2 grams of 2-carboxyethyl (phenyl) phosphinic acid and 0.02 grams of antimony oxide catalyst. Polymerization was conducted in the same manner as described in Example I. The resulting polymer had an inherent viscosity of 0.92 at a concentration of 0.5 grams/deciliter in a solution of 60% phenol/40% tetrachloroethane at 25° C. The polymer had a diethylene glycol content of 2.10% by weight, and the glass transition temperature and the melting point determined by differential scanning calorimeter were 68.1° C. and 239.9° C. respectively. The results of Example VIII are shown in Table 1.

EXAMPLE IX

The process of Example I was repeated with 18 grams of the esterification product of ethylene glycol and 4,4'-biphenyl dicarboxylic acid (bis-$\beta$-hydroxy ethyl bibenzoate) where the molar ratio was 2 to 1 respectively, 2 grams of 2-carboxyethyl(phenyl) phosphinic acid and 0.02 grams of antimony oxide catalyst. Polymerization was conducted in the same manner as described in Example I. The resulting polymer had a diethylene glycol content of 1.7% by weight and the glass transition temperature determined by differential scanning calorimeter was 90.1° C. The results of Example IX are shown in Table 1.

The following Table shows the results of the reactions described in the Examples above. The Table includes the ratio of the reactants present in the reactor and the properties of the resulting copolymers. The properties included in the Table are the intrinsic viscosity (I.V.), the diethylene glycol content, and the glass transition temperature and melting point in degrees Centigrade (Tg). In Table 1 the term "PET" means the esterification product of ethylene glycol and terephthalic acid (polyethylene terephthate prepolymer), the term "HEB" means the esterification product of ethylene glycol and 4,4'-biphenyl dicarboxylic acid (bis-$\beta$-hydroxy ethyl bibenzoate), the term "CPA" means 2-carboxyethyl(phenyl) phosphinic acid and the term "DEG" means diethylene glycol.

TABLE 1

| EXAMPLE | PET/HEB/CPA | DEG (%) | I.V. | Tg (°C.)/ MP (°C.) |
|---|---|---|---|---|
| I | 20—0—0 | 1.45 | 0.90 | 77.0–218.6 |
| II | 14—4—2 | 1.0 | 0.63 | 78.1– |
| III | 12—6—2 | 1.27 | 1.05 | 81.1– |
| IV | 10—8—2 | 2.34 | 0.88 | 80.1– |
| V | 6—12—2 | 4.26 | 0.83 | 82.7–205.1 |
| VI | 4—14—2 | 3.47 | 0.77 | 88.1–226.4 |
| VII | 2—16—2 | 3.75 | 0.6 | 90.8–245 |
| VIII | 18—0—2 | 2.10 | 0.92 | 68.1–239.9 |
| IX | 0—18—2 | 1.7 | | 90.1– |

While certain preferred embodiments of the invention have been illustrated and described herein, it is to be understood that the invention is not limited thereby and that the invention may be variously practiced within the scope of the following claims.

I claim:

1. A flame retardant linear polyester comprising the product of:
   a polyester prepolymer;
   a hydroxy alkyl dicarboxylate compound having the general formula:

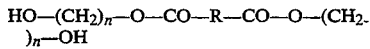
   HO—(CH$_2$)$_n$—O—CO—R—CO—O—(CH$_2$)$_n$—OH wherein n is a number from 1 to 8 and R is selected from the group consisting of aliphatic groups having from 2 to about 12 carbon atoms; benzene; substituted benzene wherein the substituent is a halogen, an alkyl group having a carbon chain of from 1 to about 8 carbon atoms, or a phenyl or substituted phenyl group; naphthyl; substituted naphthyl wherein the substituent is hydrogen, halogen, an alkyl group having a carbon chain of from 1 to about 8 carbon atoms, phenyl or substituted phenyl; and a moiety having the general formula:

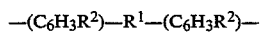
   —(C$_6$H$_3$R$^2$)—R$^1$—(C$_6$H$_3$R$^2$)— wherein R$^1$ is selected from the group consisting of nil, oxygen, phenyl, substituted phenyl, an alkyl group having a carbon chain of from 1 to about 8 carbon atoms, and —HC=CH— and wherein each R$^2$ is independently selected from the group consisting of hydrogen, halogen, an alkyl group having a carbon chain of from 1 to about 8 carbon atoms, phenyl and substituted phenyl; and a flame retardant amount of a carboxy-phosphinic acid having the general formula:

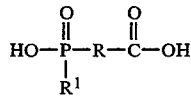

wherein R is selected from the group consisting of saturated open-chain or cyclic alkylene radicals having from one to about 15 carbon atoms, and arylene and aralkylene radicals having from 1 to about 15 carbon atoms and R$^1$ is selected from the group consisting of alkyl radicals having up to about 6 carbon atoms, aryl radicals and alkaryl radicals wherein the alkyl substituent has from 1 to about 6 carbon atoms.

2. The flame retardant linear polyester of claim 1 wherein the polyester prepolymer is selected from the group consisting of polyethylene terephthalate prepolymer, polybutylene terephthalate prepolymer and polyethylene naphthanate prepolymer.

3. The flame retardant linear polyester of claim 2 wherein the polyester prepolymer is polyethylene terephthalate prepolymer.

4. The flame retardant linear polyester of claim 2 wherein the polyester prepolymer is polyethylene naphthanate prepolymer.

5. A flame retardant linear polyester comprising the product of a polyester prepolymer, bis-hydroxy alkyl bibenzoate and a flame-retarding carboxy-phosphinic acid monomer, the carboxy-phosphinic acid monomer being present in an amount of from about 0.1% to about 10% by weight based upon the total weight of the polyester.

6. The flame retardant linear polyester of claim 5 wherein the alkyl substituent of the bis-hydroxy alkyl bibenzoate is selected from the group consisting of alkyl radicals having from 1 to 8 carbon atoms.

7. The flame retardant linear polyester of claim 6 wherein the bis-hydroxy alkyl bibenzoate is bis-$\beta$-hydroxy ethyl bibenzoate.

8. The flame retardant linear polyester of claim 5 wherein the carboxy-phosphinic acid monomer is selected from the group consisting of 2-carboxyethyl (phenyl)phosphinic acid, 2-carboxyethyl(methyl) phosphinic acid, the cyclic anhydride of 2-carboxyethyl(phenyl)phosphinic acid and the cyclic anhydride of 2-carboxyethyl(methyl)phosphinic acid.

9. The flame retardant linear polyester of claim 8 wherein the carboxy-phosphinic acid monomer is 2-carboxyethyl(phenyl)phosphinic acid.

10. The flame retardant linear polyester of claim 8 wherein the carboxy-phosphinic acid monomer is 2-carboxyethyl(methyl)phosphinic acid.

11. A flame retardant linear polyester comprising the product of a polyester prepolymer, bis-hydroxy alkyl naphthanate and a flame-retarding carboxy-phosphinic acid monomer, the carboxy-phosphinic acid monomer being present in an amount of from about 0.1% to about 10% by weight based upon the total weight of the polyester.

12. The flame retardant linear polyester of claim 11 wherein the alkyl substituent of the bis-hydroxy alkyl naphthanate is selected from the group consisting of alkyl radicals having from 1 to 8 carbon atoms.

13. The flame retardant linear polyester of claim 12 wherein the bis-hydroxy alkyl naphthanate is bis-β-hydroxy ethyl naphthanate.

14. The flame retardant linear polyester of claim 11 wherein the carboxy-phosphinic acid monomer is selected from the group consisting of 2-carboxyethyl(phenyl)phosphinic acid, 2-carboxyethyl(methyl)phosphinic acid, the cyclic anhydride of 2-carboxyethyl(phenyl)phosphinic acid and the cyclic anhydride of 2-carboxyethyl(methyl)phosphinic acid.

15. The flame retardant linear polyester of claim 14 wherein the carboxy-phosphinic acid monomer is 2-carboxyethyl(phenyl)phosphinic acid.

16. The flame retardant linear polyester of claim 14 wherein the carboxy-phosphinic acid monomer is 2-carboxyethyl(methyl)phosphinic acid.

17. A process for the production of a flame retardant linear polyester comprising condensing a mixture of a polyester prepolymer, bis-hydroxy alkyl bibenzoate and a flame-retarding amount of a carboxy-phosphinic acid monomer in the presence of a catalyst at a temperature between about 250° C. and about 293° C.

18. The process for the production of a flame retardant linear polyester of claim 17 wherein the polyester prepolymer is selected from the group consisting of polyethylene terephthalate prepolymer, polybutylene terephthalate prepolymer and polyethylene naphthanate prepolymer.

19. The process for the production of a flame retardant linear polyester of claim 18 wherein the polyester prepolymer is polyethylene terephthalate prepolymer.

20. The process for the production of a flame retardant linear polyester of claim 17 wherein the alkyl substituent of the bis-hydroxy alkyl bibenzoate is selected from the group consisting of alkyl radicals having from 1 to 8 carbon atoms.

21. The process for the production of a flame retardant linear polyester of claim 20 wherein the bis-hydroxy alkyl bibenzoate is bis-hydroxy ethyl bibenzoate.

22. The process for the production of a flame retardant linear polyester of claim 17 wherein the carboxy-phosphinic acid monomer is selected from the group consisting of 2-carboxyethyl(phenyl) phosphinic acid, 2-carboxyethyl(methyl)phosphinic acid, the cyclic anhydride of 2-carboxyethyl (phenyl)phosphinic acid and the cyclic anhydride of 2-carboxyethyl(methyl)phosphinic acid.

23. The process for the production of a flame retardant linear polyester of claim 17 wherein the carboxy-phosphinic acid monomer is 2-carboxyethyl (phenyl)-phosphinic acid.

24. A process for the production of a flame retardant linear polyester comprising condensing a mixture of a polyester prepolymer, bis-hydroxy alkyl bibenzoate and a flame-retarding carboxy-phosphinic acid monomer, the carboxy-phosphinic acid monomer being present in an amount of from about 0.1% to about 10% by weight based upon the total weight of the polyester, in the presence of a catalyst at a temperature between about 250° C. and about 293° C.

25. The process of claim 24 wherein the alkyl substituent of the bis-hydroxy alkyl bibenzoate is selected from the group consisting of alkyl radicals having from 1 to 8 carbon atoms.

26. The process of claim 25 wherein the bis-hydroxy alkyl bibenzoate is bis-β-hydroxy ethyl bibenzoate.

27. The process of claim 24 wherein the carboxy-phosphinic acid monomer is selected from the group consisting of 2-carboxyethyl(phenyl)phosphinic acid, 2-carboxyethyl(methyl)phosphinic acid, the cyclic anhydride of 2-carboxyethyl(phenyl)phosphinic acid and the cyclic anhydride of 2-carboxyethyl (phenyl)phosphinic acid.

28. The process of claim 27 wherein the carboxy-phosphinic acid monomer is 2-carboxyethyl(phenyl)-phosphinic acid.

29. The process of claim 27 wherein the carboxy-phosphinic acid monomer is 2-carboxyethyl (methyl)-phosphinic acid.

30. A process for the production of a flame retardant linear polyester comprising condensing a mixture of a polyester prepolymer, a dicarboxylic acid, a diol and a flame-retarding amount of a carboxy-phosphinic acid monomer in the presence of a catalyst at a temperature between about 250° C. and about 293° C.

31. The process for the production of a flame retardant linear polyester of claim 30 wherein the dicarboxylic acid is selected from the group consisting of aliphatic dicarboxylic acids having from 2 to about 12 carbon atoms, isophthalic acid, substituted terephthalic acid and the dicarboxylic acids of biphenyls, naphthalene, terphenyls and diphenyl ether.

32. The process for the production of a flame retardant linear polyester of claim 31 wherein the dicarboxylic acid is biphenyl dicarboxylic acid.

33. The process for the production of a flame retardant linear polyester of claim 31 wherein the dicarboxylic acid is naphthalene dicarboxylic acid.

34. The process for the production of a flame retardant linear polyester of claim 31 wherein the diol is selected from the group consisting of aliphatic diols having from 3 to 7 carbon atoms.

35. The process for the production of a flame retardant linear polyester of claim 34 wherein the diol is ethylene glycol.

36. The flame retardant linear polyester of claim 1 in the form of a shaped article.

37. The flame retardant linear polyester of claim 1 in the form of a fiber.

38. A flame retardant linear polyester shaped article comprising the product of a polyester prepolymer, dicarboxylic acid and a flame-retarding amount of 2-carboxyethyl(phenyl)phosphinic acid.

39. The flame retardant linear polyester shaped article of claim 38 wherein the 2-carboxyethyl(phenyl)-phosphinic acid is present in an amount of from about 0.1% to about 10% by weight based upon the total weight of the polyester.

40. The flame retardant linear polyester shaped article of claim 38 wherein the polyester prepolymer is selected from the group consisting of polyethylene terephthalate prepolymer, polybutylene terephthalate prepolymer and polyethylene naphthanate prepolymer.

41. The flame retardant linear polyester shaped article of claim 40 wherein the polyester prepolymer is polyethylene terephthalate.

42. The flame retardant linear polyester shaped article of claim 38 wherein the dicarboxylic acid is selected from the group consisting of aliphatic dicarboxylic acids having from 2 to about 12 carbon atoms, isophthalic acid, substituted terephthalic acid and the dicarboxylic acids of biphenyls, naphthalene, terphenyls and diphenyl ether.

43. The flame retardant linear polyester shaped article of claim 42 wherein the dicarboxylic acid is biphenyl dicarboxylic acid.

44. The flame retardant linear polyester shaped article of claim 42 wherein the dicarboxylic acid is naphthalene dicarboxylic acid.

45. The flame retardant linear polyester shaped article of claim 42 wherein the shaped article is a fiber.

* * * * *